United States Patent
Tjeerdsma et al.

(10) Patent No.: US 9,599,987 B2
(45) Date of Patent: Mar. 21, 2017

(54) AUTONOMOUS MOBILE ROBOT AND METHOD FOR OPERATING THE SAME

(71) Applicant: Koninklijke Philips N.V., Eindhoven (NL)

(72) Inventors: Peter Tjeerdsma, Thesinge (NL); Jeroen Johannes Gerardus Vennegoor Op Nijhuis, Groningen (NL); Natarajan Ganapathy Subramanian, Nijmegen (NL); Karel Dekker, Wijk Bij Duurstede (NL); Peter Hoekstra, Waalre (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 0 days.

(21) Appl. No.: 14/431,074

(22) PCT Filed: Jun. 28, 2013

(86) PCT No.: PCT/IB2013/063708
§ 371 (c)(1),
(2) Date: Mar. 25, 2015

(87) PCT Pub. No.: WO2014/048597
PCT Pub. Date: Apr. 3, 2014

(65) Prior Publication Data
US 2016/0195875 A1 Jul. 7, 2016

(51) Int. Cl.
*G05D 1/00* (2006.01)
*G05D 1/02* (2006.01)

(52) U.S. Cl.
CPC ......... *G05D 1/0219* (2013.01); *G05D 1/0227* (2013.01); *G05D 1/0274* (2013.01); *G05D 2201/0215* (2013.01); *Y10S 901/01* (2013.01)

(58) Field of Classification Search
CPC .. G05D 1/0272; G05D 1/0278; G05D 1/0255; G05D 1/024; G05D 1/0242
See application file for complete search history.

(56) References Cited

U.S. PATENT DOCUMENTS

| | | |
|---|---|---|
| 6,142,252 A | 11/2000 | Kinto |
| 7,584,020 B2 | 9/2009 | Bruemmer |
| 2011/0125324 A1 | 5/2011 | Baek |

FOREIGN PATENT DOCUMENTS

WO    WO2012089679 A1    7/2012

OTHER PUBLICATIONS

"Robot Vacuum Cleaners", Neato, Neato Features, 2009 allonrobots.com.

(Continued)

*Primary Examiner* — Jelani Smith (57) ABSTRACT

An autonomous mobile robot is configured to move across a floor area in accordance with a floor covering strategy and includes: based on a topological map of the floor area, designating a location of a current cell that is bounded by a primary boundary; executing a series of double strokes into and within the current cell, while mapping obstructive objects within the current cell onto an obstacle map; from the obstacle map, determining a secondary boundary of the current cell that encloses an area of the current cell covered by the executed double strokes, and distinguishes between secondary boundary portions thereof at which an obstructive object is located, and secondary boundary portions thereof at which no obstructive object is located; and adding the determined secondary boundary to the topological map of the floor area.

12 Claims, 4 Drawing Sheets

(56) References Cited

OTHER PUBLICATIONS

Kwangro Joo et al., "Generating Topological Map from Occupancy Grid-Map Using Virtual Door Detection", IEEE Congress on Evolutionary Computation (CEC), 2010, pp. 1-6.

Ju Yong Park et al., "A Study on the Cleaning Algorithm for Autonomous Mobile Robot Under the Unknown Environment", Robot and Human Communication, 1997. RO-MAN '97. Proceedings., 6th IEEE International Workshop on Robot and Human Communication, pp. 70-75.

AUTONOMOUS MOBILE ROBOT AND METHOD FOR OPERATING THE SAME

CROSS-REFERENCE TO RELATED APPLICATIONS

This patent application claims the priority benefit under 35 U.S.C. §371 of international patent application no. PCT/IB2013/063708, filed Jun. 28, 2013, which claims the priority benefit of European Patent Application No. 12186215.5 filed Sep. 27, 2012, the contents of which are herein incorporated by reference.

FIELD OF THE INVENTION

The present invention relates to an autonomous mobile robot capable of systematically navigating a cluttered floor area, and to a method for operating such a robot.

BACKGROUND OF THE INVENTION

Known autonomous mobile robots for treating floors, e.g. robotic vacuum cleaners, may have difficulties navigating floor areas that are, at least to some extent, covered with obstacles such as furniture and other cluttering, obstructive objects. To achieve suitable coverage of a cluttered floor area, some robots employ an approach that involves a random or simple repetitive (e.g. zig-zag) movement pattern. While executing the selected movement pattern, the robot may maintain a map that divides the floor area being treated up into relatively coarse cells. Cells that are either covered by the robot or unreachable may be marked correspondingly, and navigation and coverage may continue until no reachable, uncovered cell is left.

A disadvantage of such an approach is that it is generally unsystematic and therefore inefficient. Due to an excess of movements and covered distance the robot's position tracking system may also exhibit a gradually increasing position error, which may cause the robot to loose its bearings and get mislocalized, which may inevitably result in poor floor covering performance.

SUMMARY OF THE INVENTION

It is an object of the present invention to provide for an autonomous mobile robot that is capable of systematically and efficiently navigating and covering cluttered floor areas.

It is another object of the present invention to provide for a method of operating an autonomous mobile robot, wherein said method enables systematic and efficient navigation of cluttered floor areas.

Accordingly, a first aspect of the present invention is directed to an autonomous mobile robot. The robot may comprise a drive system for propelling the robot across a floor area, at least one perceptor for detecting obstructive objects, and a controller that is operably connected to both the drive system and the perceptor. The controller may be configured to control the drive system in order to move the robot across the floor area in accordance with a floor covering strategy, which may include: based on a topological map of the floor area, designating a location of a current cell, wherein said current cell is spatially bounded by a primary boundary. The floor covering strategy may also include, from an entry point at the primary boundary of said current cell, executing an initial double stroke into the current cell, and, subsequently, designating a forking point disposed that is within said current cell, preferably on a path of the initial double stroke, and from said forking point executing a number of additional, angularly-distributed double strokes within the current cell. The floor covering strategy may further include: with the aid of said at least one perceptor mapping obstructive objects within the current cell onto an obstacle map during execution of the double strokes, and then from said obstacle map determining a secondary boundary associated with the current cell. The secondary boundary may enclose at least part of an area of the current cell covered by the executed double strokes, and distinguish between secondary boundary portions thereof at which an obstructive object is located, and secondary boundary portions thereof at which no obstructive object is located. The floor covering strategy may further include adding the determined secondary boundary of the current cell to the topological map of the floor area.

A second aspect of the present invention is directed to a method of operating an autonomous mobile robot so as to move the robot across a floor area. The method may include controlling the robot in accordance with floor covering strategy, which may include; based on a topological map of the floor area, designating a location of a current cell, wherein said current cell is spatially bounded by a primary boundary. The floor covering strategy may also include, from an entry point at the primary boundary of said current cell, executing an initial double stroke into the current cell, and, subsequently, designating a forking point that is disposed within said current cell, preferably located on a path of the initial double stroke, and from said forking point executing a number of additional, angularly-distributed double strokes within the current cell. The floor covering strategy may further include mapping obstructive objects within the current cell onto an obstacle map, preferably during execution of the double strokes, and from said obstacle map determining a secondary boundary associated with the current cell. The secondary boundary may enclose at least part of an area of the current cell covered by the executed double strokes, and distinguish between secondary boundary portions thereof at which an obstructive object is located, and secondary boundary portions thereof at which no obstructive object is located. The floor covering strategy may further include adding the determined secondary boundary of the current cell to the topological map of the floor area.

The presently disclosed floor covering strategy for an autonomous mobile robot, such as a robotic vacuum cleaner (RVC), is based on the cell-by-cell coverage of floor area to be covered. Each of the cells into which the floor area is divided may be spatially bounded by a primary boundary, and different cells may be congruent, such that their primary boundaries have a same shape and size. Coverage of an area of a single cell, during coverage referred to as the 'current cell', may take place in two phases.

The first phase may involve the execution of an initial double stroke into the current cell, where the double stroke may start from an entry point of the current cell disposed on the primary boundary thereof. In this text, the term 'double stroke' may be construed to refer to a back-and-forth movement of the robot. Accordingly, the initial double stroke may include a forward stroke or forward movement from the entry point of the current cell towards a primary boundary portion of the current cell opposite the entry point, and a subsequent backward stroke or backward movement back towards the entry point. Both the forward and backward strokes may typically be straight, and the backward stroke may, at least in part, retrace the forward stroke. A length of the backward stroke of the initial double stroke may preferably be shorter than the length of the forward stroke of the initial double stroke, such that the robot may be located inside of the current cell upon completion of the initial double stroke.

The second phase may involve the designation of a 'forking point' within the current cell. The forking point may be located on a path of the initial double stroke, and preferably coincide with an end point of the backward stroke thereof. From the forking point, the robot may execute a number of additional, angularly-distributed double strokes within the current cell. Each additional double stroke may include a forward stroke towards the primary boundary of the current cell, and a subsequent backward stroke back to the forking point inside the current cell. As with the initial double stroke, the backward stroke of an additional double stroke may retrace the corresponding forward stroke. Unlike the initial double stroke, however, the lengths of the forward and backward strokes of additional double strokes may preferably be the same. Furthermore, any double stroke may preferably be unique in that no additional double stroke fully overlaps with either the initial double stroke or another additional double stroke.

In general, the execution of the double strokes, both initial and additional, may serve to both systematically cover an area of the current cell, and to facilitate the detection of any obstacles thereon. With respect to this latter function, the double strokes executed within the current cell may be considered to be explorative: during the execution of a double stroke, the robot may detect and locate obstacles in its surroundings, for instance by means of the at least one perceptor (e.g. a range sensor or a bump sensor), and map any such found obstacles onto an obstacle map of the current cell.

Upon completion of all double strokes, the obstacle map of the current cell may be employed to determine a secondary boundary of the current cell. The secondary boundary may typically extend at least partly within the primary boundary of the current cell, enclose an area of the current cell actually covered by the executed double strokes, and indicate possible entries and exits to that area. To that end, portions of the secondary boundary at which obstructive objects are located may be distinguished, i.e. marked differently, from portions at which no obstructive objects were found. The secondary boundary, including these markings of traversable and non-traversable/blocked secondary boundary portions, may then be added to a topological map of the floor area being covered. In this topological map the location of a strategic point within the current cell, such as the geometrical center of the actually covered area of the current cell enclosed by the secondary boundary, may be marked as a 'travel node' or 'way point'; the travel node represents a location with generally good travel perspectives, and may be used for inter-cellular travel. In case the current cell was designated based on the selection of the traversable secondary boundary portion of a previously covered cell, the respective boundary portion may be marked 'processed'. Then a new yet unprocessed secondary boundary portion may be selected from the topological map. The robot may travel to the selected unprocessed secondary boundary portion via the travel nodes in the topological map, and, once the secondary boundary portion is reached, either attack it with a specialist move and mark it as 'processed', or designate a new current cell that may be entered via the selected secondary boundary portion and cover this new current cell as described above. It is understood that the floor covering strategy may provide for repeated execution of the steps of selecting an unprocessed secondary boundary portion from the topological map, travelling to the selected unprocessed secondary boundary portion along travel nodes registered in the topological map, designating a current cell, covering the current cell by initial and additional double strokes, determining a secondary boundary of the current cell, and expanding/updating the topological map of the floor area to be covered. The process may be continued until no unprocessed secondary boundary portions are left in the topological map.

As mentioned, the execution of the double strokes, both initial and additional, may generally serve to both systematically cover a floor area of the current cell, and to facilitate the detection of any obstacles thereon. In one embodiment, the initial double stroke may have the particular additional function of assessing a 'depth' of the current cell, so as to enable determination of whether coverage of the current cell's floor area through additional double strokes is possible, and if so, how many such additional double strokes are desired, and according to what angular distribution. In a preferred embodiment, the execution of additional, angularly distributed double strokes may be conditional upon a minimum accomplished length of the forward stroke of the initial double stroke. That is, if execution of the initial double stroke must be aborted due to obstruction of its path, an actual or accomplished length of its forward stroke may be smaller than its maximum length. If the accomplished length of the forward stroke is below a predetermined minimum threshold, the current cell's depth may be held to be too shallow for the meaningful execution of additional double strokes, and the execution of such additional double strokes may be abandoned. In another preferred embodiment, the number of additional double strokes may be related to an accomplished length of the forward stroke of the initial double stroke, such that a greater accomplished length of said forward stroke corresponds to a larger number of additional double strokes.

These and other features and advantages of the invention will be more fully understood from the following detailed description of certain embodiments of the invention, taken together with the accompanying drawings, which are meant to illustrate and not to limit the invention.

DETAILED DESCRIPTION OF THE EMBODIMENTS

Figure 1:
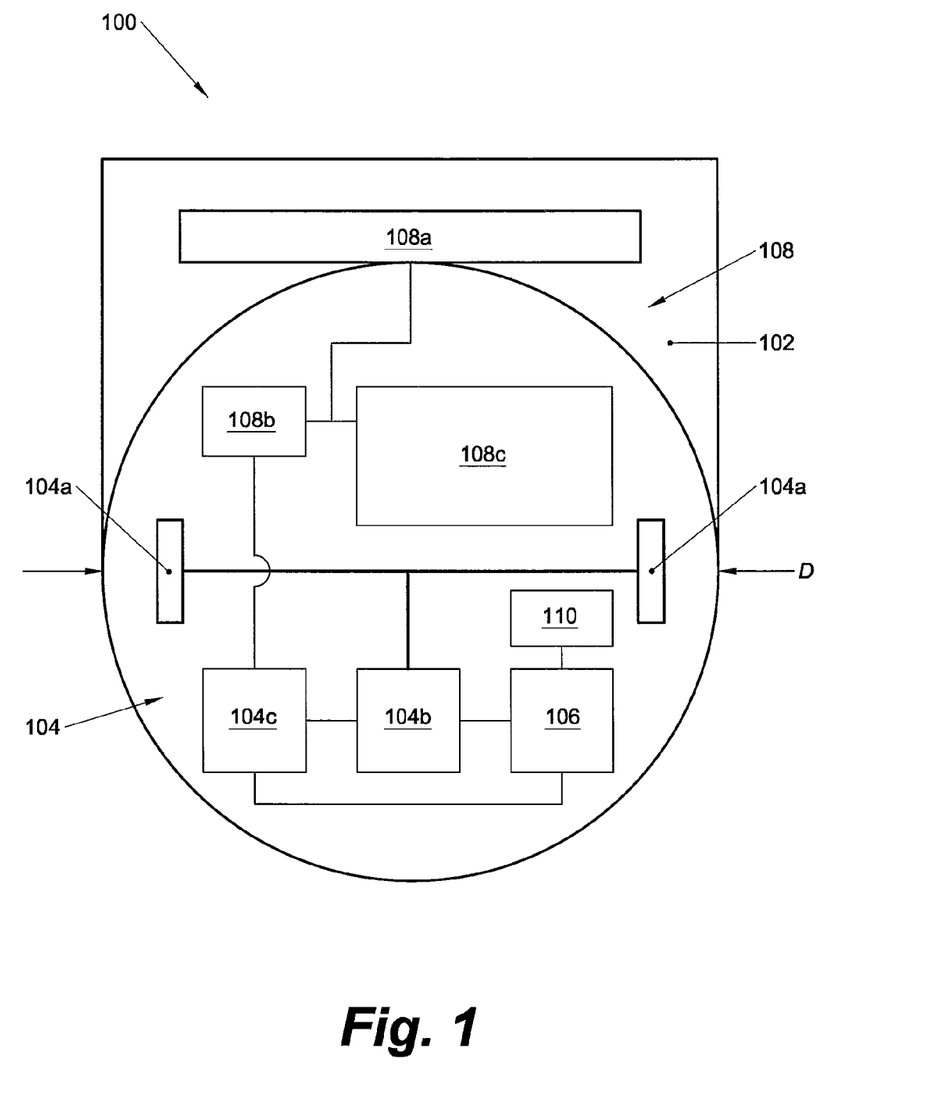
FIG. 1 is a schematic top view layout of an exemplary embodiment of a robotic vacuum cleaner according to the present invention.

FIG. 1 shows a schematic top view layout of an autonomous mobile robot 100, more specifically a robotic vacuum cleaner (RVC), according to the present invention.

In general the robot 100 may include a housing 102, in or on which other components may be provided. In the depicted embodiment, the housing 102 has a notable non-circular circumferential shape including a straight (front) edge that enables a better reach of the RVC, especially in corners. The robot 100 may also include a controller 106 that is operably connected to, for instance, a drive system 104, a floor treatment system 108, and one or more perceptors 110. The controller 106 may include a processor capable of executing firmware or software operating instructions, and a memory for storing variable information—such as an obstacle map of a cell and a topological map of a floor area being covered—that is operably coupled to the processor. The drive system 104 may be configured to drive or propel the robot 100 across a floor. It may typically include a plurality of wheels 104a, rollers, tracks, and the like, each of which may be operably connected to an (electro)motor 104b or alternative actuator for providing it with locomotive power. Electrical power for the (electro)motor or alternative actuator may be provided by a rechargeable battery 104c operably coupled thereto. In the case of an RVC, as depicted, the floor treatment system 108 may typically include a nozzle 108a, a dust container 108c, and a vacuum source/(vacuum) suction means 108b for sucking dust through the nozzle 108a into the dust container 108c. It is understood, however, that other embodiments of the autonomous mobile robot 100 need not be vacuum cleaners; instead, they may, for instance, incorporate a floor treatment system of a different kind, such as a system of waxing or mopping a floor. The perceptors 110 may include odometers and wheel encoders that may be configured in conjunction with the wheels 104a of the drive system 104, inertial sensors, tactile sensors such as bump sensors, compasses, range sensors, Global Positioning System (GPS) sensors, imaging devices such as digital cameras, etc. Range sensors are understood to be suitable for locating objects in the environment, including determining respective distances to said objects, and may in principle be of any suitable type. A range sensor may, for instance, be an optical sensor, such as a infra-red sensor, or an acoustic sensor, such as an ultrasound sensor. As one skilled in the art will appreciate, range sensors may typically include a generator-component and a sensor-component; e.g. an optical range sensor may include a laser for emitting a laser beam, and a light sensor configured to detect (reflected) light waves from the laser so as to detect interruptions or phase shifts therein.

Figure 2:
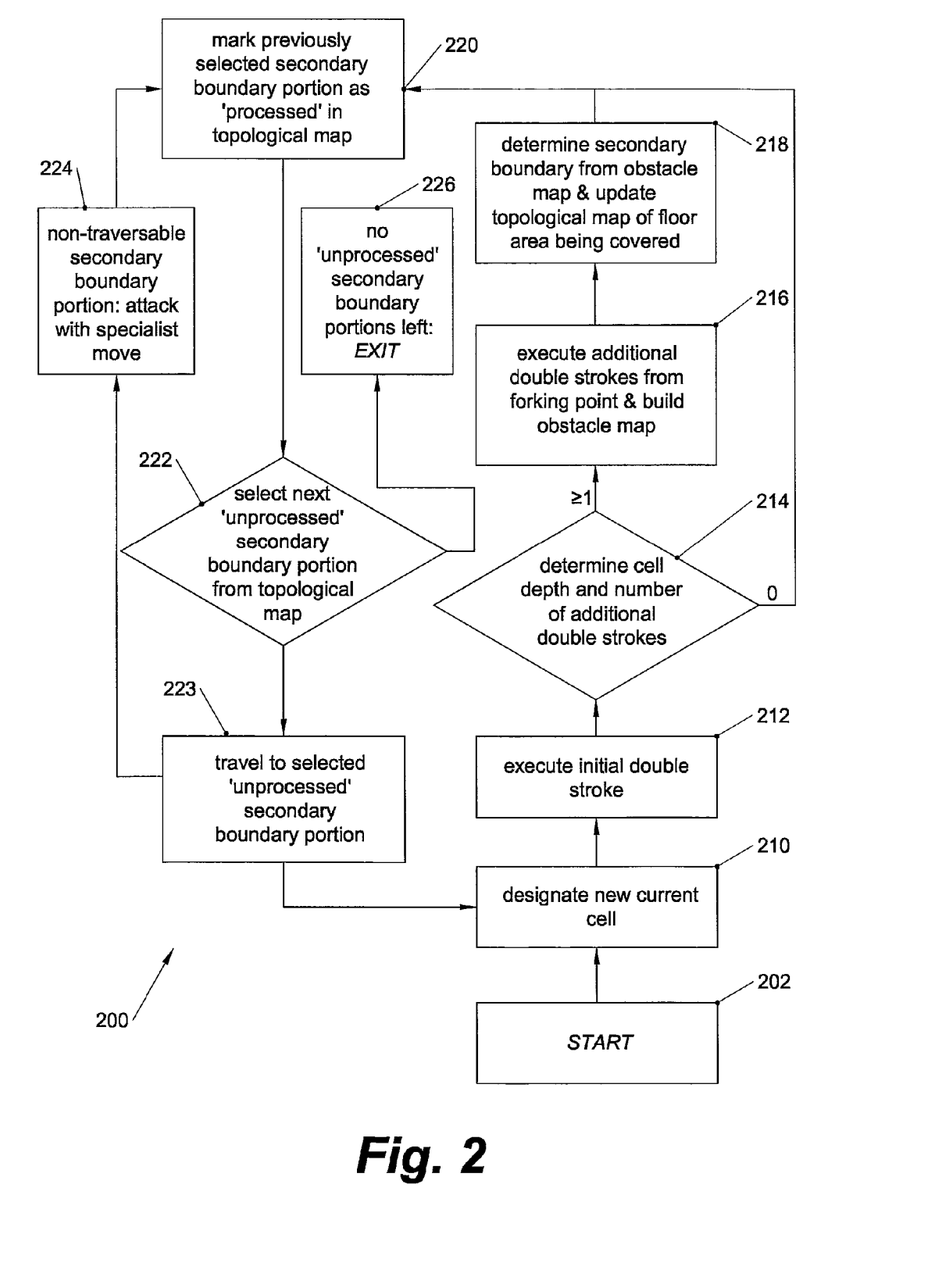
FIG. 2 is a flow chart of an exemplary floor covering strategy for covering a densely cluttered floor area that the controller of the robotic vacuum cleaner shown in FIG. 1 may be configured to execute.

During operation, the robot 100 may be under the control of the controller 106, which may be configured to control the drive system 104 in order to move the robot across a floor area to be covered. In particular in (densely) cluttered areas, where standard open space strategies are inefficient, the controller 106 may control the drive system in accordance with the presently disclosed cell-based floor covering strategy to accomplish this task. It this respect, it may be noted that the controller 106 may be configured to execute different floor covering strategies, depending on whether it finds itself in a cluttered or uncluttered/open space. For instance, in case the controller 106 detects that the robot 100 finds itself in a cluttered area, it may control the drive system in accordance with the presently disclosed cell-based floor covering strategy, while, in case the controller 106 detects that the robot 100 finds itself in an uncluttered area, it may control the drive system in accordance with an open space strategy, e.g. execution of a zig-zag movement pattern. An exemplary flow chart of the presently disclosed floor covering strategy for cluttered areas is schematically shown in FIG. 2. The depicted strategy is elucidated below; coverage of a single cell of floor area is discussed first, followed by a discussion of the identification, interrelation and coverage of further cells. In the discussion, different concepts of the floor covering strategy are illustrated with reference to FIG. 3A-F.

Coverage of a single cell is described by in particular blocks 210-220 of the flow chart of FIG. 2.

The process of covering a single cell may start with the designation of a 'current cell', as indicated in block 210. The designation of a current cell may normally be based on the selection of an unprocessed secondary boundary portion of a previously covered cell from a topological map of the floor area being covered (see block 222). Designation of the current cell may then entail assigning a predetermined primary boundary to a region of floor area (thereby effectively determining the location and orientation of the current cell on said floor area), such that the primary boundary portion at least partially coincides with the unprocessed secondary boundary portion selected from the topological map. The primary boundary is, if it were, catenated to the (unprocessed secondary boundary portion of the) respective previously covered cell. At the start of a floor covering job, however, the topological map of the floor covering area may still be empty, and not facilitate the selection of an unprocessed secondary boundary portion of a previous cell. In this case, the controller 106 may randomly assign a region of floor area the status of current cell, and proceed as indicated below.

In the present context, a cell 300 may be understood to be a functional unit of floor area having predetermined dimensions. The dimensions of a cell 300 may preferably be chosen significantly smaller than those of the overall floor area to be covered, such that the floor area may be divided into multiple cells, and exceed the dimensions of the housing 102 of the robot 100 that is to cover it, such that the robot 100 may move within the confines of a cell 300. A cell 300 may preferably be polygonal, and in particular rectangular, in shape. In relation to the robot 100, both a width and a length of a cell 300 may preferably be in the range of 1.5-4.0 times a characteristic or maximum outer diameter D of its housing 102.—As will become clear below, cells 300 that are too large relative to the dimensions of the robot 100 may not be efficiently coverable. This is due to the proposed additional, angularly-distributed double strokes S2-S7 extending from a forking point F within the cell 300 (see FIGS. 3A-B): near the forking point F an overlap between the angularly-adjacent double strokes S2-S7 may be relatively large, while gaps may exist between the additional double strokes S2-S7 at the far ends thereof. The only remedy against the gaps at the far ends of the additional double strokes S2-S7 is condensing the angular spread of the double additional strokes, which is undesirable in view of the simultaneous increase in repeatedly covered floor area near the forking point F.

Figures 3A, 3B:
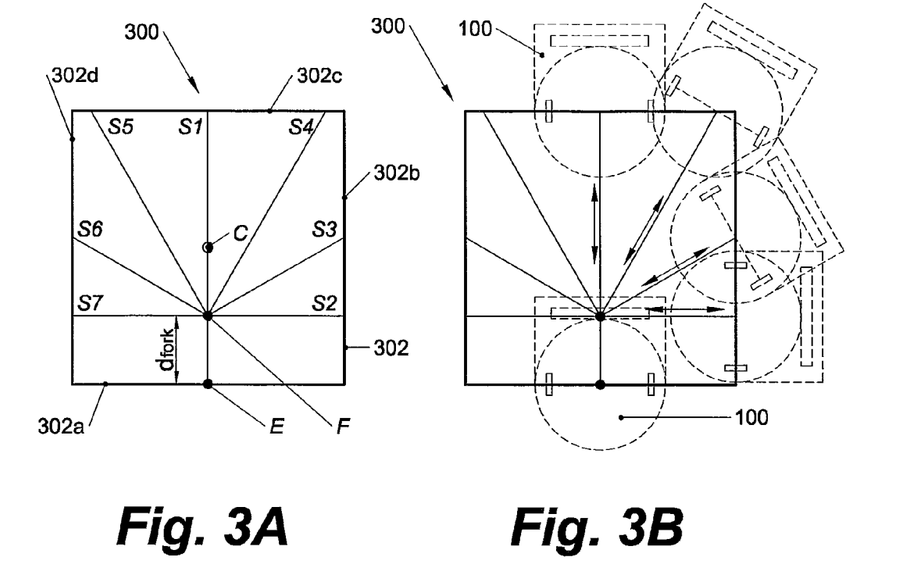
FIG. 3A schematically illustrates the paths of initial and additional double strokes that may be executed in a current cell in accordance with the floor covering strategy shown in FIG. 2.
FIG. 3B schematically illustrates the execution of initial and additional double strokes in a current cell by the robot in accordance with the floor covering strategy shown in FIGS. 2 and 3A.

FIGS. 3A-B schematically illustrate an exemplary cell 300, spatially bounded by a rectangular primary boundary 302 having a bottom boundary portion 302a, a right boundary portion 302b, a top boundary portion 302c, and a left boundary portion 302d. Once a region of floor area has been designated as the current or next cell to be covered (block 210 in the flow chart of FIG. 2), the controller 106 may control the drive system 104 to have the robot 100 enter the current cell 300 via one of primary boundary portions 302a-d. The respective primary boundary portion 302a-d may normally at least partially coincide with a selected 'unprocessed' secondary boundary portion of an already covered cell, as will be clarified below. The point on the respective primary boundary portion 302a at which the robot 100 enters the cell 300 may be referred to as the entry point E; this entry point E may typically correspond with a center of the aforementioned secondary boundary portion with which the primary boundary portion 302a at least partially coincides.

Upon entry of the cell 300, the controller 106 may control the drive system 104 to execute an initial double stroke; this step is represented by block 212 of the flow chart of FIG. 2. The initial double stroke, whose path is labelled S1 in FIG. 3A, may include a forward stroke and a subsequent backward stroke. The forward stroke may entail a normally straight forward movement into the cell 300, substantially perpendicular to the primary boundary portion 302a and away from the entry point E located thereon, and towards a primary boundary portion 302c of the cell 300 opposite the entry point E, while the backward stroke may entail a movement back towards the entry point E.

Figure 3C:
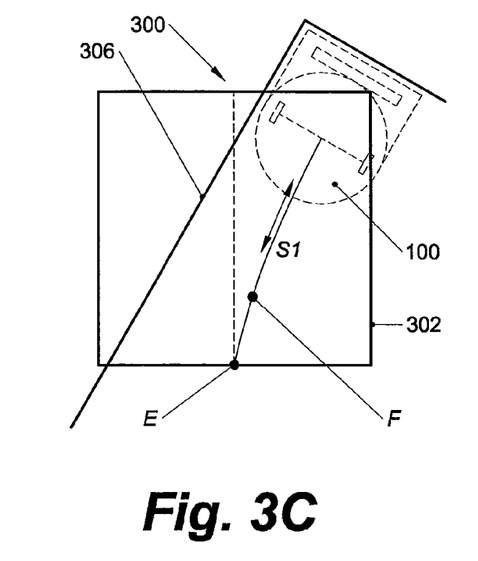
FIG. 3C schematically illustrates the execution of a non-linear initial double stroke as a result of the presence of an obstructive object within the primary boundary of the current cell.

A maximum length of the forward stroke of the initial double stroke S1 may correspond to a distance between the entry point E of the current cell 200 and the primary boundary portion 202c opposite the entry point E, and the robot 100 may seek to accomplish a forward stroke having this maximum length. However, when the area covered by the current cell 300 is cluttered, an object present thereon may obstruct the completion of a straight forward stroke. The presence of such an obstructive object may be detected in various ways, in particular by means of perceptors 110 in the form of range or bump sensors. In case an obstructive object is detected, the robot 100 may be configured to abort the execution of the forward stroke and to settle for a forward stroke having a smaller than maximum length. Alternatively, as shown in FIG. 3C, the robot 100 may be configured to avoid the object—here: a wall 306—by steering around or alongside it, thereby accepting a non-linear forward stroke that deviates from a linear forward stroke by a certain maximum deviation angle and/or distance. In any case, a point located halfway the forward stroke may be marked as the (coverable) cell center C, as indicated in FIG. 3A; the cell center C may be regarded as a strategic point with good travel perspectives whose location may be stored in a topological map as a 'travel node' that may be used for inter-cellular travel, as will be discussed below.

During the backward stroke that follows the forward stroke, the robot 100 may retrace the path covered on the forward stroke. In doing so, it may preferably not completely return to the entry point E of the current cell, but instead halt at a forking point F located a certain distance $d_{fork}$ therefrom (see FIG. 3A). The distance $d_{fork}$ may typically be approximately half, e.g. about 0.4-0.6 times, the characteristic or maximum outer radius D of the housing 102 of the robot 100, such that the robot 100 may later execute straight additional double strokes S2, S7 from the forking point F in parallel and virtually grazing contact with the primary boundary portion 302a defining the entry point E.

As indicated by blocks 214 and 216 of the flow chart of FIG. 2, the initial double stroke S1 may be followed by a series of additional, angularly distributed double strokes S2-S7. Each additional double stroke S2-S7 may include a forward stroke that starts at the forking point F, and a backward stroke that ends at the forking point F; see FIGS. 3A-B. Whether—and if so, how many—such additional double strokes are to be undertaken may be decided on the basis of an accomplished or actual length of the forward stroke of the initial double stroke S1. This decision is represented by block 214 of the flow chart of FIG. 2, and may be illustrated with reference to FIG. 3D.

Figure 3D:
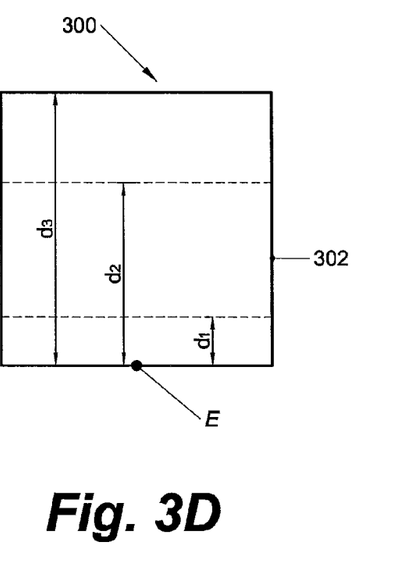
FIG. 3D schematically illustrates the various possible cell depths of a current cell.

The actual or accomplished length of the forward stroke of the initial double stroke S1 may be taken to define a depth of the current cell 300. FIG. 3D indicates three different cell depths $d_1$, $d_2$, $d_3$. A current cell 300 having an uncluttered floor area may have a maximum cell depth $d_3$ (effectively corresponding to an inner diameter of the cell), and be assigned a maximum number of additional double strokes, e.g. six: S2-S7. A cell 300 whose area is largely covered by an obstructive object, on the other hand, may have a modest cell depth $d_1$. If the cell depth $d_1$ is below a certain shallowness threshold, the cell 300 may not be properly coverable because it may not afford the robot 100 sufficient space to maneuver it. Accordingly, such a cell 300 may be assigned zero additional double strokes. A cell 300 having a smaller than maximum cell depth $d_2$ that nevertheless exceeds the shallowness threshold, may be assigned a number of additional double strokes that is larger than zero, but smaller than the maximum number of additional double strokes normally assigned to cells with a maximum cell depth.

In case the determined cell depth does not allow for the execution of additional double strokes S2-S7 within the cell 300, the cell's area may be regarded to have been covered by the partially executed forward stroke of the initial double stroke S1. Consequential upon this finding, the secondary boundary portion on the topological map that corresponds to and at least partially coincides with the primary boundary portion 302a of the cell via which the robot entered the current cell 300 may be marked 'processed', as indicated by block 220 of the flow chart of FIG. 2. If, however, additional double strokes S2-S7 have been assigned to the cell 300, the robot 100 may execute these double strokes as indicated by block 216 of the flow chart of FIG. 2.

As regards the particulars of the additional double strokes S2-S7, the following may be noted. A maximum length of a forward stroke of a respective additional double stroke S2-S7 may equal a distance between the forking point F and the point at which a primary boundary portion 302a-d of the current cell 300 intersects a respective additional double stroke direction vector that is based at the forking point F and extends in the direction of the forward stroke. As with the initial double stroke S1 described above, the robot 100 may seek to accomplish additional double strokes S2-S7 having a forward stroke of maximum length. However, in case the floor area of the cell 300 is cluttered, and an object 306 present thereon blocks completion of the forward stroke of an additional double stroke S2-S7, the robot 100 may be forced to abort the execution of the forward stroke and to settle for an additional double stroke having a smaller than maximum length. The angular distribution of the additional double strokes S2-S7 may preferably be chosen such that the additional double strokes S2-S7 together cover an angular range of at least 180 degrees. In the situation of FIG. 3A, this angular range is determined by the aligned additional double strokes S2 and S7, and precisely covers 180 degrees. An average angle included by angularly adjacent additional double strokes S2-S7 may be ≤90 degrees, and preferably be in the range of 20-60 degrees.

When the robot 100 has completed all additional double strokes S2-S7 from the forking point F, it may evaluate its coverage of the current cell 300 as reflected by block 218 of the flow chart of FIG. 2. The evaluation may in particular be aimed at the determination of a secondary boundary 304 of the current cell 300, which boundary may be regarded to topologically characterize and bound the current cell 300. More specifically, the secondary boundary 304 may provide information about both the area of the cell 300 that has actually been covered, and the locations of obstructive objects 306 present thereon.

Figure 3E:
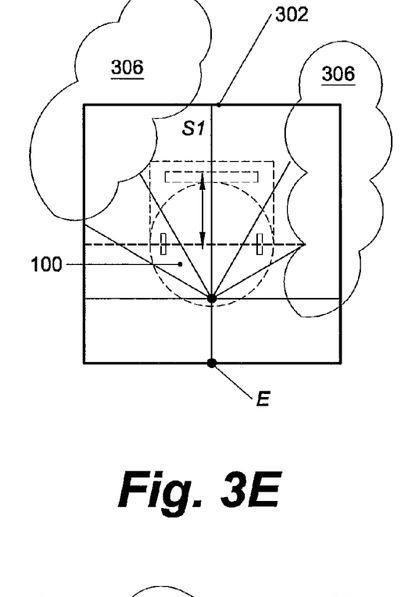
FIGS. 3E-G schematically illustrate the determination of a secondary boundary of the current cell.
Figure 3F:
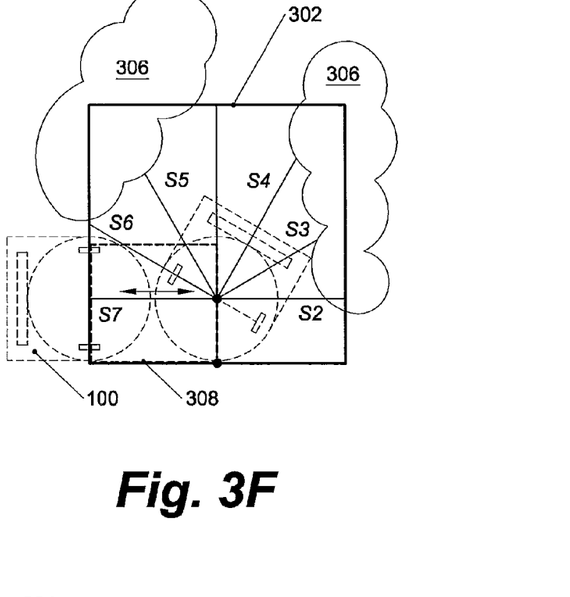
Figure 3G:
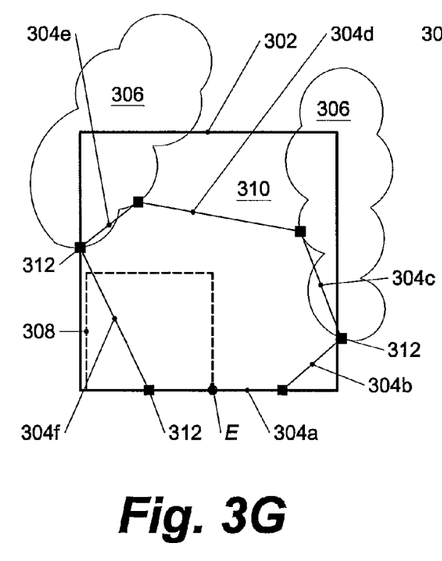

The determination of the secondary boundary 304 of the current cell 300 is schematically illustrated in FIGS. 3E-G.

The determination of the secondary boundary 304 may involve the determination of an actual area of the current cell 300 covered during the collective double strokes S1-S7, for example from suitable perceptor readings taken during the execution of the double strokes S1-S7, such as, for instance, readings from wheel encoders that specify the maxima of forward, left and right travel within the current cell 300. In conjunction, these perceptor reading may define a circumscribing polygon 308, e.g. rectangle, that delimits a portion of cell area located on or within the primary boundary 302 of the current cell 300, and that has been traversed by the robot 100. By way of example, FIGS. 3E and 3F schematically depict how the accomplished lengths of the initial double stroke S1 and additional double strokes S2-S7, respectively, may determine a rectangle 308 that bounds the actually covered area. As shown in FIGS. 3E and 3F, the current cell's area is partially occupied by two objects 306. The objects 306 obstruct the completion of the initial double stroke S1 (FIG. 3A). Of the additional double strokes S2-S7, only leftward double stroke S7 may be fully executed; the additional double strokes S2-S4 cannot be executed at all, while the additional double strokes S5 and S6 can be executed only partially (FIG. 3B). The maxima of forward, left and right travel of the robot 100 within the current cell 300—travel being assessed with reference to a central point on the robot 100, located between its wheels 104a—define a rectangular boundary 308 that corresponds to the third or lower-left quadrant of the current cell 300, and that delimits the actually covered area thereof.

The actually covered area 308 of the current cell 300 may be marked on an obstacle map generated during the execution of the double strokes S1-S7; see FIG. 3G. The obstacle map may identify the presence and (approximate) locations of obstructive objects 306 present in the current cell 300, which may have been identified through perceptor readings taken during the execution of the double strokes S1-S7, for instance through range or environment scans performed by means of a range sensor.

From the obstacle map comprising both an indication of the actually covered area 308 of the current cell 300 and the locations of obstructive objects 306 present in the current cell 300, a secondary boundary 304 of the current cell 300 may be constructed. To this end, an intermediate area 310 between the boundary 308 of the actually covered floor area and the primary boundary 302 of the current cell 300 may be used as a mask, and a circumferential path may be traced through the intermediate area 310—and where no such intermediate area 310 is present because the boundaries 302 and 308 coincide: along the primary boundary 302—, marking transitions between a non-obstructed intermediate area portion (not covered by an obstructive object 306) and an obstructed intermediate area portion (covered by an obstructive object 306) with a node 312. The nodes 312 may be interconnected to form the preferably polygonal, secondary boundary 304 including various secondary boundary portions 304a-f. In a preferred embodiment, nodes 312 of the secondary boundary 304 disposed on the primary boundary portion 302a on which the entry point E of the current cell 300 is located may preferably not be set to the vertices of the respective primary boundary portion 302a, so as to force the construction of wider and mutually non-perpendicular secondary boundary portions 304a-f; simulations have shown that this improves travelling and floor coverage.—It will be clear that in the particular case of a current cell 300 that does not accommodate any obstructive objects 306, the primary and secondary boundaries 302, 304 of the current cell 300 may largely or wholly coincide.

In general, one secondary boundary portion 304a of the current cell 300 may at least partially coincide with the primary boundary portion 302a thereof that defines the entry point E of the current cell 300, and that itself partially coincides with a secondary boundary portion of a previously covered cell from which the current cell 300 was entered. Other secondary boundary portions 3b-f may be marked in accordance with their relation to obstructive objects 306. That is, secondary boundary portions 304e, 304c, which correspond to obstructed intermediate area portions, may be marked 'obstructed', while secondary boundary portions 304b, 304d, 304f, which correspond to unobstructed intermediate area portions, may be marked 'unprocessed'.

As reflected by block 218 of the flow chart of FIG. 2, the determined secondary boundary 304 of the current cell 300 may be added to a topological map on which it is linked to that of the previously covered cell from which the robot 100 entered the current cell (if any). Additional data relating to the current cell, for instance the position of its center point C which may conveniently serve as a travel node or way point for inter-cellular travel, may also be stored. In case the topological map reveals an overlap between the secondary boundary 304 of the current cell 300 and secondary boundaries of previously covered cells, the respective intersecting secondary boundary portions 304a-f of the overlapping cells may be marked 'processed'.

Once the current cell 300 has been covered, and the topological map has been updated, the secondary boundary portion 304a across which the robot 100 entered the current cell may be marked 'processed'. This step concludes the coverage of a single cell, and is indicated by block 220 of the flow chart of FIG. 2.

The above-described single cell coverage strategy may form the basic building block of a more comprehensive recursive floor covering strategy. This strategy may supplement the single cell covering strategy with a selection algorithm that decides which unobstructed, yet unprocessed secondary boundary portion in the topological map is up next for processing. In the flow chart of FIG. 2, the selection decision is indicated by decision block 222. The function and operation of the selection algorithm may be clarified as follows.

At the start of a floor covering job, when the topological map provides no guidance yet, the robot 100 may randomly designate a first current cell 300, and initiate the coverage thereof as described above. This first cell may be referred to as the root cell, and for instance correspond to the unit of floor area right in front of the robot 100. Once coverage of the root cell has been completed, the topological map may identify its secondary boundary 304. Secondary boundary portions 304a-f that are not 'obstructed' and marked 'unprocessed' may warrant further exploration, in particular because they may unlock further floor area to be covered. The selection algorithm may now be invoked to select an unobstructed, 'unprocessed' secondary boundary portion for processing (block 222 of the flow chart of FIG. 2), and the robot may travel towards this selected secondary boundary portion (block 223 of the flow chart of FIG. 2). In case the stored dimensions of the selected secondary boundary portion indicate that it may be traversable (e.g. because it is wide enough for the robot to cross), the robot 100 may designate a new current cell located at the unexplored side of the secondary boundary portion (block 210 in the flow chart of FIG. 2), move towards an entry point E of the new current cell, and initiate its coverage. In case the dimensions of the selected secondary boundary portion indicate that it is non-traversable (e.g. because a length of the secondary boundary portion is smaller than a characteristic diameter D of the robots housing 102), but it may still unlock some floor area to be covered, the robot 100 may attack the selected secondary boundary portion with a specialist move in an attempt to cover as much of it as possible (block 224 in the flow chart of FIG. 2). Once the respective selected secondary boundary portion has thus been processed, it may be marked as such (block 220 in the flow chart of FIG. 2), and the selection algorithm may be invoked again to determine whether further unobstructed, 'unprocessed' secondary boundary portions are available. In case such a further secondary boundary portion is found and selected, the robot 100 may travel to the selected secondary boundary portion (block 223 of the flow chart of FIG. 2). Where inter-cellular travel is required to reach the selected secondary boundary portion, the robot 100 may travel via the travel nodes optionally stored in the topological map. Upon arrival, the robot 100 may initiate an appropriate coverage action in order to process the selected secondary boundary portion; the appropriate coverage action may typically be based on the width or length of the boundary portion, as described above. This process of exploration and processing may continue until no 'unprocessed' secondary boundary portions are left in the topological map, at which point the floor covering strategy may be terminated (block 226 of the flow chart of FIG. 2).

The precise nature of the selection algorithm may differ for different embodiments. Since the topological map effectively organizes cells in a graph structure (in which the cells define nodes and the secondary boundary portions at which no obstructive object is located define branches that interconnect two nodes), commonly known algorithms for graph traversal may be employed to systematically expand and explore the topological map. An advantageous example of such an algorithm is depth-first exploration, in which processing starts at a root cell, and exploration and processing along a developing branch is continued as far as possible before backtracking. Other examples include breadth-first exploration, shortest path-first exploration, etc.

Figure 3H:
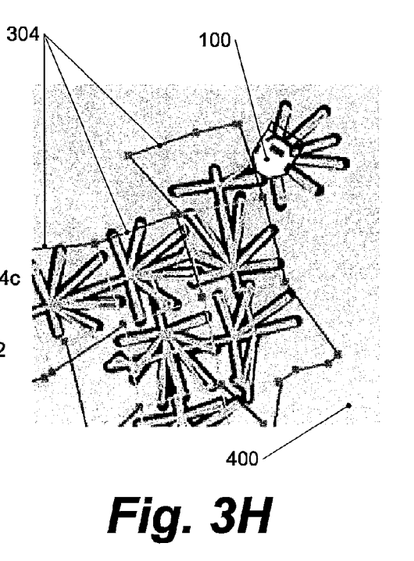
FIG. 3H schematically illustrates, in a top view, the covering of a floor area by the robot shown in FIG. 1 in accordance with the floor covering strategy set out in FIG. 2.

To complete the discussion of the presently disclosed floor covering strategy, FIG. 3H schematically illustrates, in a top view, how a moderately cluttered floor area 400 is being covered by a robot 100 in accordance with the floor covering strategy set out in FIG. 2. FIG. 3H shows the polygonal secondary boundaries 304 of different covered cells, the topological interrelations between these cells, and which double strokes S1-S7 have been executed within each of them. The current cell being covered by the robot 100 is located at the top-right of the Figure.

Although illustrative embodiments of the present invention have been described above, in part with reference to the accompanying drawings, it is to be understood that the invention is not limited to these embodiments. Variations to the disclosed embodiments can be understood and effected by those skilled in the art in practicing the claimed invention, from a study of the drawings, the disclosure, and the appended claims. Reference throughout this specification to "one embodiment" or "an embodiment" means that a particular feature, structure or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, it is noted that particular features, structures, or characteristics of one or more embodiments may be combined in any suitable manner to form new, not explicitly described embodiments.

LIST OF ELEMENTS 100 autonomous mobile robot/robotic vacuum cleaner (RVC)
102 housing
104 drive system
104a wheels
104b electromotor
104c battery
106 controller
108 floor treatment system
108a nozzle
108b vacuum source
108c dust container
110 perceptor
200 floor covering strategy
202 starting cluttered floor area coverage strategy
210 designating a new current cell
212 executing initial double stroke
214 determining a cell depth of the current cell, and a number of additional double strokes to be executed therein
216 executing additional double strokes from forking point, while building an obstacle map of the current cell
218 determining a secondary boundary of the current cell from the obstacle map, and expanding a topological map of the floor area being covered
220 marking the previously selected secondary boundary portion 'processed' in the topological map
222 selecting a next 'unprocessed' secondary boundary portion from the topological map
223 traveling to the selected 'unprocessed' secondary boundary portion
224 in case the selected 'unprocessed' secondary boundary portion is non-traversable: attacking it with a specialist move
226 in case no 'unprocessed' secondary boundary portions are left: exiting cluttered floor area coverage strategy
300 cell
302 primary boundary
302a,b,c, . . . primary boundary portions
304 secondary boundary
304a,b,c, . . . secondary boundary portions
306 obstructive object
308 boundary of actually covered floor area
310 intermediate area (in between 308 and 302)
312 node of secondary boundary
400 floor area to be covered
C center of cell
D characteristic outer radius of robot housing d cell depth
$d_{fork}$ distance between entry edge of cell and forking point
F forking point

The invention claimed is:

1. An autonomous mobile robot, comprising:
   a drive system;
   at least one perceptor for detecting obstructive objects;
   a controller that is operably connected to both the drive system and the least one perceptor, said controller being configured to control the drive system in order to move the robot across a floor area in accordance with a floor covering strategy that includes:
   based on a topological map of the floor area, designating a location of a current cell, wherein the current cell includes a functional unit of the floor area being covered by the robot, and wherein said current cell is spatially bounded by a primary boundary;
   from an entry point at the primary boundary of said current cell; executing an initial double stroke into the current cell that includes both a forward stroke for a forward movement, and a backward stroke for a backward movement of the robot;
   designating a forking point disposed within said current cell, and from said forking point executing a number of additional double strokes within the current cell that are angularly distributed;
   during execution of the initial double stroke and the additional double strokes, mapping obstructive objects within the current cell onto an obstacle map by said at least one perceptor;
   from said obstacle map, determining a secondary boundary associated with the current cell, wherein said secondary boundary encloses at least part of an area of the current cell covered by the executed initial double stroke and the additional double strokes, and distinguishes between first portions of the secondary boundary at which an obstructive object is located, and second portions of the secondary boundary at which no obstructive object is located; and
   adding the determined secondary boundary of the current cell to the topological map of the floor area.

2. The autonomous mobile robot according to claim 1, wherein the execution of additional double strokes is conditional upon a minimum accomplished length of the forward stroke of the initial double stroke.

3. The autonomous mobile robot according to claim 1, wherein the number of additional double strokes is related to an accomplished length of the forward stroke of the initial double stroke, such that a greater accomplished length of said forward stroke corresponds to a larger number of the additional double strokes.

4. The autonomous mobile robot according to claim 1, wherein an angular distribution of the additional double strokes covers an angular range of at least 180 degrees.

5. The autonomous mobile robot according to claim 1, wherein an average angle between adjacent strokes of the additional double strokes is ≤90 degrees.

6. The autonomous mobile robot according to claim 1, wherein the at least one perceptor includes an optical or acoustic range sensor.

7. The autonomous mobile robot according to claim 1, wherein at least one of the primary boundary and the secondary boundary is polygonal, such that respective boundary portions of the at least one of the primary boundary and the secondary boundary are defined by substantially straight edges.

8. The autonomous mobile robot according to claim 1, wherein a housing of said robot has an outer diameter D, and
   wherein a distance between the entry point and the forking point of the current cell is in a range of 0.4 D to 0.6 D.

9. The autonomous mobile robot according to claim 1, wherein said robot has an outer diameter D, and
   wherein the current cell, as defined by the primary boundary, has both a width and a length in a range of 1.5 D to 4.0 D.

10. The autonomous mobile robot according to claim 1, further comprising a floor treatment system configured to treat the floor area across which the robot moves during operation by vacuuming, mopping or waxing.

11. The autonomous mobile robot according to claim 10, wherein the floor treatment system includes a vacuum cleaning system having a nozzle for sucking up dirt from the floor area, and a vacuum source that is operably connected to said nozzle.

12. A method of operating an autonomous mobile robot so as to move the robot across a floor area, wherein said method includes controlling the robot in accordance with a floor covering strategy that includes acts of:
    based on a topological map of the floor area, designating a location of a current cell, wherein the current cell includes a functional unit of the floor area being covered by the robot, and wherein said current cell is spatially bounded by a primary boundary;
    from an entry point at the primary boundary of said current cell, executing an initial double stroke into the current cell that includes a forward stroke for a forward movement, and a backward stroke for a backward movement of the robot;
    designating a forking point disposed within said current cell, and from said forking point executing a number of additional double strokes within the current cell that are angularly distributed;
    during execution of the initial double stroke and the additional double strokes, mapping obstructive objects within the current cell onto an obstacle map;
    from said obstacle map, determining a secondary boundary associated with the current cell, wherein said secondary boundary encloses at least part of an area of the current cell covered by the executed initial double stroke and additional double strokes, and distinguishes between first portions of the secondary boundary at which an obstructive object is located, and second portions of the secondary boundary at which no obstructive object is located; and
    adding the determined secondary boundary of the current cell to the topological map of the floor area.

* * * * *